United States Patent

[11] 3,572,952

| [72] | Inventor | Erik W. Anthon<br>Kensington, Calif. |
|---|---|---|
| [21] | Appl. No. | 706,812 |
| [22] | Filed | Feb. 20, 1968 |
| [45] | Patented | Mar. 30, 1971 |
| [73] | Assignee | American Optical Corporation<br>Southridge, Mass. |

[54] FLOAT CUVETTE
3 Claims, 14 Drawing Figs.

[52] U.S. Cl.............................................. 356/246,
73/208, 73/308, 250/218
[51] Int. Cl..................................................... G01n 1/10
[50] Field of Search........................................ 356/207,
208, 246; 250/218; 73/207, 208, 308

[56] References Cited
UNITED STATES PATENTS

| 2,003,474 | 4/1932 | Schweitzer................ | 73/208 |
| 2,262,807 | 11/1941 | Larner...................... | 73/207 |
| 2,413,352 | 12/1946 | Hulsberg.................... | 73/207-X |
| 2,581,588 | 1/1952 | Greene...................... | 73/207 |
| 2,970,561 | 2/1961 | Ashwood.................... | 73/207-X |
| 3,225,645 | 12/1965 | Baruch et al................ | 356/246 |
| 3,302,613 | 2/1967 | Noorlander.................. | 73/208-X |

Primary Examiner—Ronald L. Wilbert
Assistant Examiner—Warren A. Sklar
Attorneys—Albert H. Graddis, Henry E. Millson, Jr. and Frank S. Chow ABSTRACT: A novel cuvette assembly consisting of the combination of a hollow transparent cuvette element containing a float in which the float is so shaped as to control the path of a fluid sample entering the cuvette and cause it to wash the interior of the cuvette. As the float rises in the cuvette, it carries with it the initial wash portion of the sample preventing mixing with the test portion of the sample entering the cuvette.

Patented March 30, 1971
3,572,952
3 Sheets-Sheet 1
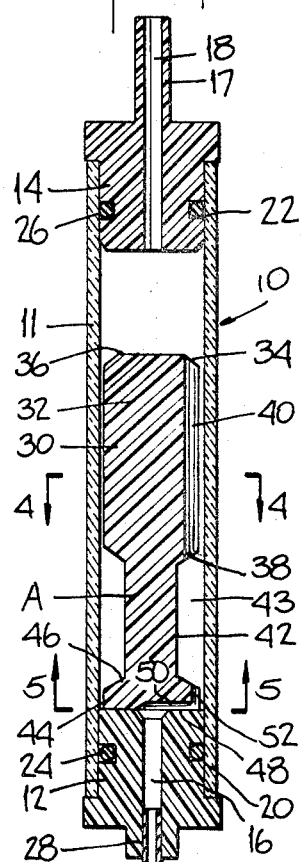
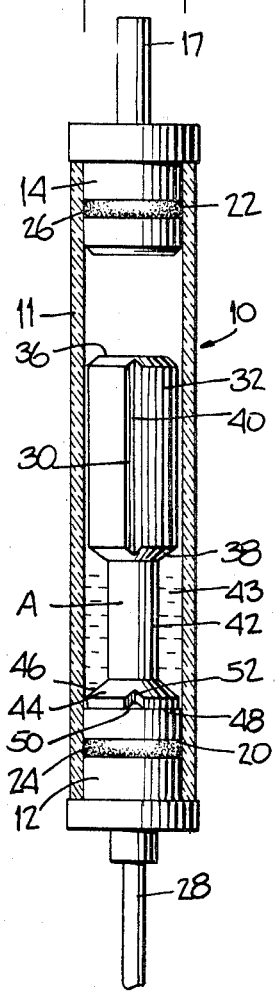
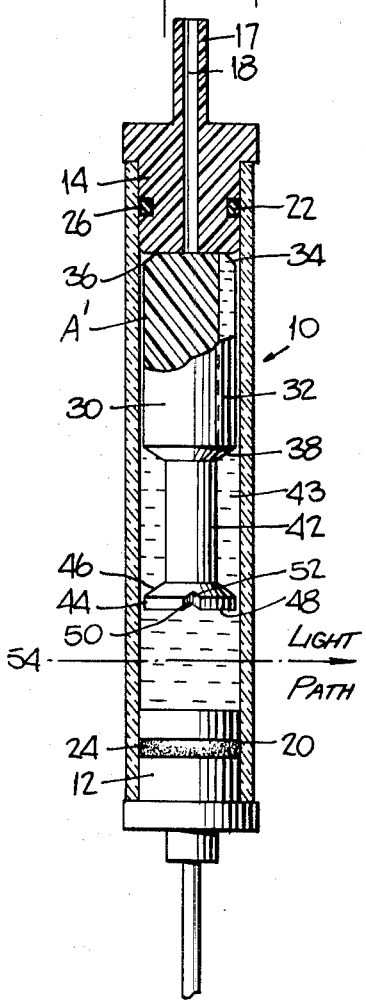
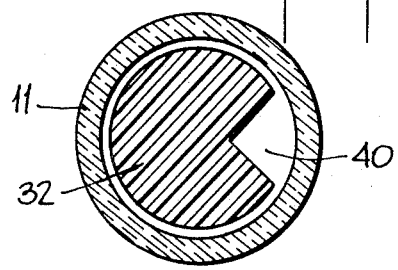
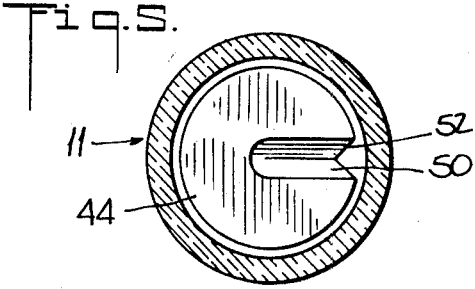
INVENTOR.
ERIK W. ANTHON
BY
Albert H. Graddis
ATTORNEY

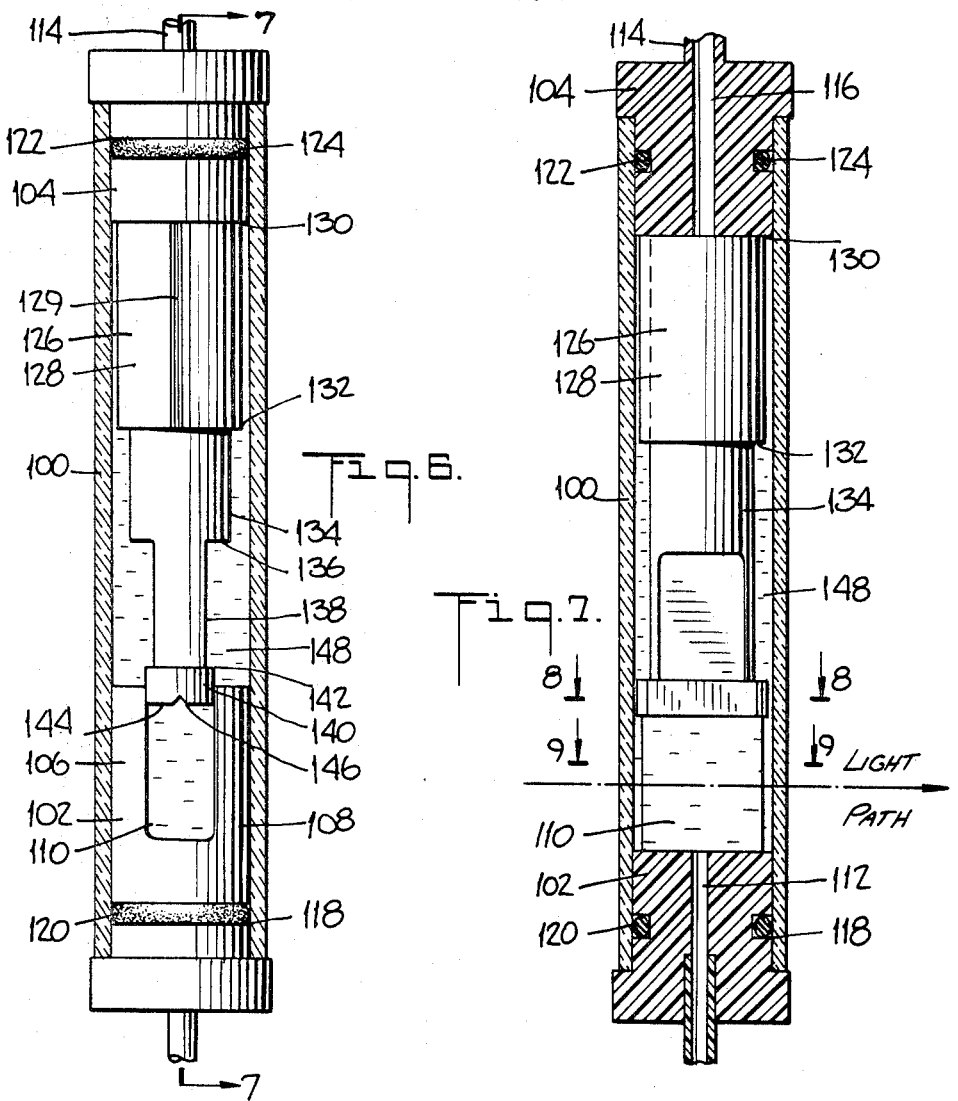
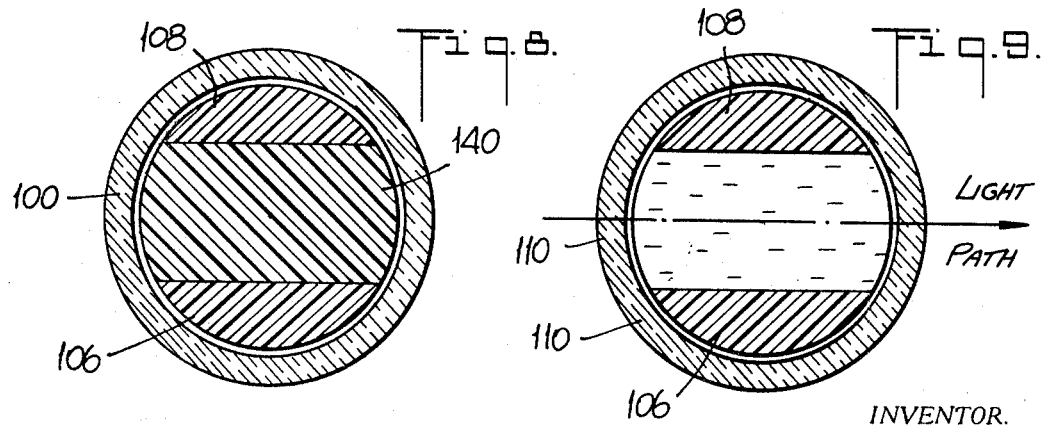
INVENTOR.
ERIK W. ANTHON

Patented March 30, 1971
3,572,952
3 Sheets-Sheet 3
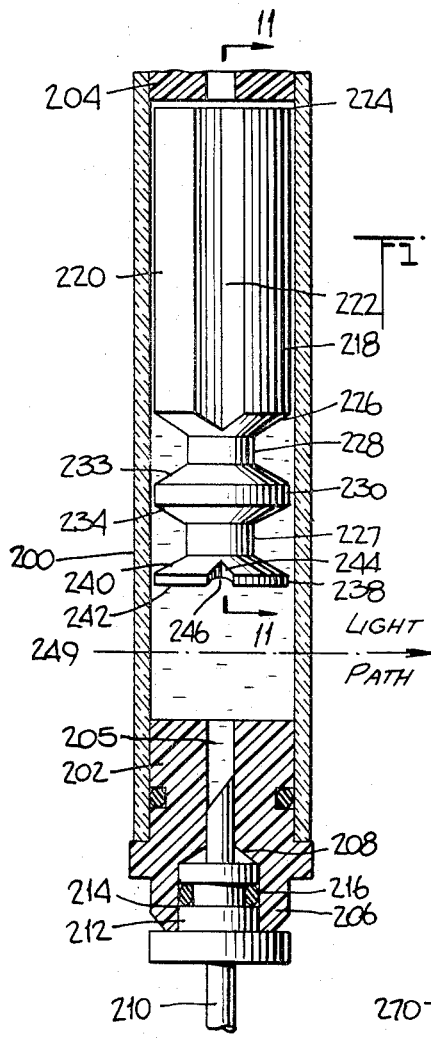
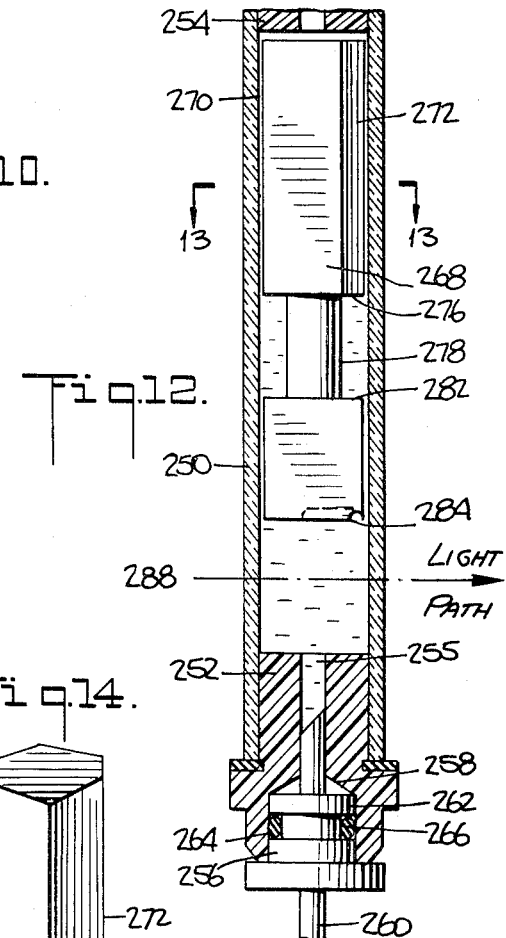
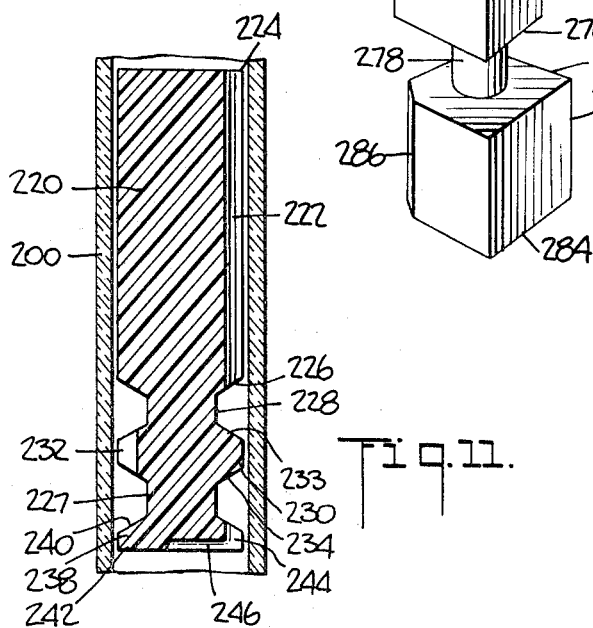
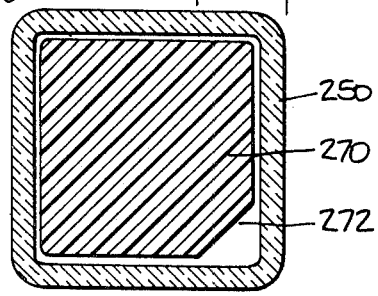
INVENTOR.
ERIK W. ANTHON
BY Albert H. Graddis
ATTORNEY

FLOAT CUVETTE

BACKGROUND OF THE INVENTION

Spectrophotometry involves the measurement of the ability of a dissolved substance to absorb electromagnetic radiation of precise wave lengths. These absorptions are measured at wave lengths that are generally characteristic of the chemical composition of the dissolved absorbing substance. An analyst may identify the dissolved substance as well as determine its concentration if absorption measurements are made at several wavelengths.

Spectrophotometric measurement requires three basic elements: a source of monochromatic light, a photometer to measure the absorption of the light and a transparent vessel of specified dimensions which contains the liquid sample and defines the path of light which passes through it.

In spectrophotometry, these transparent vessels are generally known as cuvettes. A liquid sample is placed in the cuvette and the color constituent in the sample absorbs light from the optical beam which is passed through it to an extent which is a function of the amount or concentration of the colored constituent and of the thickness or optical depth of the cuvette.

Automatic analyzing equipment capable of carrying out chemical analysis on a great number of samples of similar character is now in use. These automated analyzers perform their task by repetitive chemical analysis of a series of samples and are frequently used to analyze the constituents found in certain body fluids. Through such analysis much information can be derived which is of great value for medical diagnosis.

Use of such automated analytical apparatus results not only in a savings in time, but when properly programmed and used, they increase the accuracy of the determination by reducing the chance of error. Frequently, automated analytical apparatus will utilize spectrophotometric methods of identity and determine the concentration of various components contained in the body fluid samples being measured.

When such automated analytical apparatus is used to identify and determine the concentration of various constituents in a body fluid sample, it is most desirable that only small volumes of sample be required for the analytical procedure. Therefore, cuvette systems which require only small sample volumes are preferred.

When a cuvette is employed in an automated analyzer which makes repetitive tests of the same type on a series of samples which arrive at the testing point in the analyzer in a sequential fashion, it is essential that cross-contamination between the samples being tested be avoided. Accordingly, a cuvette cleaning step is frequently employed between samples; a step which substantially reduces the processing speed of the analyzer. In some instances, the sample itself is employed to cleanse the cuvette of the previous sample, a procedure which while increasing efficiency ordinarily requires increased sample volumes.

Typical small volume cuvettes currently in use require a total sample volume of approximately 5 milliliters. This volume is required to achieve an efficient washing ratio (the ratio of new sample pumped through the cuvette to sample remaining in the cell) which will produce a less than 1 percent carryover of the old sample into the new sample. The cuvette assembly of the present invention requires an appreciably smaller volume of sample for both the washing and measuring steps yet operates to cleanse the cuvette assembly very effectively and at a washing ratio which produces less than 1 percent carryover between samples.

DESCRIPTION OF PREFERRED EMBODIMENT

The instant invention relates to a new and novel cuvette and float assembly. In particular, it relates to a novel cuvette and float assembly which affords significant improvements in optical accuracy and operational convenience when used in automated analytical apparatus and requires significantly smaller sample volumes. Use of the float cuvette of my invention requires total sample volumes in the neighborhood of only from 2.4 ml. to about 2.6 ml., and provides a high ratio between the sample volume used for rinsing and cleaning and the sample volume utilized for the subsequent spectrophotometric analysis. Furthermore, when utilized in automated analytical apparatus, the float cuvette of this invention produces a carryover between consecutive samples of the order of only 0.1 percent.

Referring now to the drawings which represent preferred embodiments of the invention, in which like parts are identified by like reference numerals in each of the views:

FIG. 1 is a vertical view, in section, of one embodiment of a cuvette and float assembly of this invention showing the float in a resting position A;

FIG. 2 is a view of this same embodiment with only the cuvette shown in section and with the float rotated about 90° from FIG. 1;

FIG. 3 is a view of this same embodiment with a liquid sample in the cuvette and the float in raised position A';

FIG. 4 is an enlarged cross-sectional view of the cuvette and float taken along line 4—4 of FIG. 1 in the direction shown;

FIG. 5 is an enlarged view of the base of the float along line 5—5 of FIG. 1 and in the direction shown;

FIG. 6 is a side-elevational view of another embodiment of the float and cuvette assembly of this invention in which the float and cuvette have been modified in shape so that the sample volume required may be even further reduced.

FIG. 7 is a side-elevational view of this float and cuvette assembly partly broken away and rotated about 90° from that of FIG. 6 said view being taken along line 7—7 of FIG. 6 and in the direction shown;

FIG. 8 is a cross-sectional view of this float and cuvette assembly taken along line 8—8 of FIG. 7 in the direction shown;

FIG. 9 is an enlarged cross-sectional view of the cuvette taken along line 9—9 of FIG. 7 and showing the light path through the sample being tested.

FIG. 10 is a side-elevational view, partly in section, of a yet another embodiment of a cuvette and float assembly of this invention with the float in its uppermost position in the liquid-filled cuvette;

FIG. 11 is a cross-sectional view of said modified float taken along line 11—11 of FIG. 10;

FIG. 12 is a cross-sectional view of yet another embodiment of said cuvette and float assembly in which the float and cuvette are generally square in cross section;

FIG. 13 is a cross-sectional view of the float shown in FIG. 12 taken along line 13—13; and FIG. 14 is a view in perspective of the float shown in FIG. 12.

As stated, like numerals indicate like parts throughout the several views of the drawings.

Referring now to the drawings and more particularly to FIG. 1, the cuvette body, which is generally indicated by reference numeral 10, consists of a precision glass or quartz tube 11 closed at the lower end by a suitably shaped plug 12 and at the upper end by a second plug 14.

Plugs 12 and 14, which may be made of any suitable material, are shaped to conform to the interior of cuvette 10 and provide a tight seal. Lower plug 12 is provided with a passage 16 communicating with the interior of cuvette 10 through which any desired liquid may be introduced. Upper plug 14 is integral with a nipple 17 having a passage 18 which communicates with cuvette 10. Opening 18 provides a passage through which air may be introduced or withdrawn from cuvette 10. Lower plug 12 is provided with a circumferential notch 20 into which an O-ring 24 or other sealing ring may be inserted. Similarly, upper plug 14 is also provided with a circumferential notch 22 and O-ring 26. Thus sealed, plugs 12 and 14 prevent leakage of any sample from cuvette 10.

Any fluid sample being introduced enters cuvette 10 through a probe 28 fitted into opening 16 of lower plug 12, the liquid being moved by any suitable pumping means (not shown). Probe 28 may be made of any inert flexible material such as "Teflon" tubing, etc. Conveniently, the fluid sample may be drawn into cuvette 10 through probe 28 with the aid of suction applied at opening 18 in plug 14.

Held within cuvette 10 is a cuvette float generally indicated by reference numeral 30 which is so shaped in its several parts as to comprise, from the top down:

a. an upper section 32, closely fitting but movable within cuvette 10 and having a groove 40 cut vertically into its periphery, an upper shoulder 34 tapering inwardly to a flat top surface 36 and a lower shoulder 38 tapering inwardly which is integral with, b. an intermediate center portion 42, and c. a base portion 44 whose diameter is closely fitted to the inner surface of cuvette 10 and having an inwardly sloping upper shoulder 46 and a flat bottom surface 48 which is provided with a horizontal groove 50 cut partly across the bottom surface 48 of base 44 as shown in FIG. 5 communicating with a short vertical groove 52 cut into the side of base 44. Together, grooves 50 and 52 form a channel which permits the fluid sample to flow into cuvette 10 and up into an annular chamber 43 which is defined by the inner wall of cuvette 10 and the outer surface of the center portion 42 of float 30.

Float 30 can be conveniently made, for example, from machined or molded polypropylene, or other inert material whose specific gravity is less than that of the aqueous solution employed. Hollow floats of glass, Teflon, or ceramic materials are also suitable if float 30 is to be used with organic liquids whose specific gravity is less than polypropylene or which may attack the float.

The diameter of float 30 is adapted to conform closely to the inside diameter of cuvette 10 but sufficient dimensional clearance is provided to enable it to float freely without binding as the liquid level rises inside cuvette 10. Grooves 40, 50, and 52 provide the path for the liquid sample to flow into the cuvette 10 through probe 28.

When used in a working spectrophotometric system, the liquid sample to be tested is drawn into cuvette 10 through probe 28 and passage 16 by suction applied to nipple 17. When the liquid enters cuvette 10, float 30 is in position A as shown in FIG. 1. As the liquid enters cuvette 10, it passes through grooves 50 and 52 in the base 44 of float 30 and then rises in annular space 43. The upper portion 32 of float 30 is of sufficient weight to maintain float 30 in position A while the liquid fills annular chamber 43. When the liquid entering has filled annular space 43, it begins to exert an upward lift on float 30. Float 30, having a specific gravity less than that of the liquid sample, now rises and continues to rise until the liquid has filled the interior of cuvette 10 and top surface 36 of float 30 is seated against plug 14 in position A' shown in FIG. 3.

The liquid which enters cuvette 10 after space 43 has been filled is the liquid which causes float 30 to rise and go from position A to position A'. This is also that portion of the liquid sample which lies in cuvette 10 below surface 48 and is that which is analyzed by the spectrophotometer.

With the total volume of liquid sample required for each spectrophotometric measurement varying from about 2 ml. to about 3 ml., the first half of the liquid sample volume entering cuvette 10 washes the remainder of the previous sample from probe 28, and the surface of float 30 as it fills annular space 43.

Base 44 of float 30 creates an effective barrier between the two portions of the sample as float 30 is caused to rise from position A to position A' when further liquid sample enters the cuvette.

As float 30 rises from position A to position A', the close conformation of the periphery of base 44 to the walls of cuvette 10 dislodges and removes any air bubbles which may have formed on the walls of cuvette 10 as the liquid sample enters annular space 43.

When float 30 has seated against plug 14, in position A', a seal is created which prevents the sample from entering nipple 18. With the suction cut off this immediately halts the flow of sample into cuvette 10 through probe 28. The carryover between consecutive samples is found to be of the order of only about 0.1 percent when the float cuvette is used as described above.

When float 30 has risen to position A', a liquid filled chamber, indicated by reference numeral 54, is delineated by the walls of cuvette 10 whose horizontal dimension is defined by the diameter of cuvette 10 and whose vertical dimension is defined by the distance between base 44 of float 30 in position A' and the upper surface of lower plug 12 of cuvette 10.

To effect the desired measurement, a beam of monochromatic light is then passed through the liquid sample. Chamber 54 defines the path taken by the light; and the amount of light absorbed by the constituents of the liquid sample in chamber 54 is measured at the particular wavelengths employed. From the absorption data recorded, the concentration of the constituents in the sample can be readily determined. Since the light path is a constant, the only variable affecting absorption is the depth of color of the liquid sample.

After the absorption data for the liquid sample has been determined, it is discharged from cuvette 10 through probe 28 by application of air pressure through nipple 17 and opening 18 of plug 14. Any other suitable pumping means may be used for moving the liquid sample into and out of cuvette 10. The most desirable results are achieved when the flow of liquid is at a uniform steady rate, such as that which may be obtained with a reversible peristaltic pump. Any other convenient pumping means may likewise be utilized with good results.

Float 30 returns to position A as the liquid sample is discharged from cuvette 10. When float 30 returns to position A, the beam of light passing through chamber 54 is interrupted. This break in the light beam causes the recording means to return to a base level. Since this action occurs between each sample, the sequential absorption readings are very clearly presented to the recording device employed.

The float cuvette described may also be used in both spectrophotometers and fluorometers. Fluorometry requires the utilization of two light paths passing a right angles through the cuvette and very low carryover between consecutive samples. As chamber 54 of cuvette 10 can easily accommodate two light beams, the float cuvette can be utilized for fluorometry as well as spectrophotometry.

FIGS. 6 and 7 illustrate another and modified version of the novel cuvette of my invention.

In this modification the cuvette body, generally indicated by reference numeral 100, is closed at its lower end by a U-shaped plug 102 and at the upper end by a second plug 104. Lower plug 102 is provided with sides 106 and 108 which extend upwardly into cuvette 100 as shown in FIG. 6. The lower portion of plug 102, as shown in FIG. 7, is provided with a passage 112 through which a liquid sample may be introduced into the interior of cuvette 100 and chamber 110. Upper plug 104 is integral with a nipple 114 which contains passage 116 communicating with the interior of cuvette 100. Suitable sealing is obtained since lower plug 102 is provided with a circumferential notch 118 into which an O-ring 120 or other sealing ring may be inserted. Similarly, upper plug 104 is sealed by being provided with a circumferential notch 122 containing O-ring 124.

The float, generally identified by reference numeral 126, employed in this embodiment has an upper section 128 having a groove 129 cut vertically into its periphery, a flat top surface 130, a first shoulder 132 which is integral with intermediate center portion 134 and which is undercut to form a lower shoulder 136. Lower shoulder 136 is integral with a depending lower intermediate portion 138 which ends in a base portion 140. Base 140 has a flat upper shoulder 142 and a flat bottom surface 144 which has a groove 146 cut horizontally across the bottom surface 144 of base 140. Groove 146 permits the fluid sample entering through passage 112 to flow into cuvette 100 and thence into a chamber 148 which is defined by the inner wall of cuvette 100 and the outer surface of intermediate portions 134 and 138 of float 126. As float 126 rises the liquid sample fills chamber 110 which constitutes the chamber through which the light path extends.

The float cuvette shown in FIGS. 6 and 7 functions in the manner described above, however, the volume of the sample in chamber 110 is reduced in this cuvette due to the volume taken up by the extension of walls 106 and 108 of base plug 102 up into the cuvette 100. This modification enables an even lower carryover between samples.

FIGS. 10 and 11 illustrate yet another modification of the float and cuvette assembly of my invention. In this modification the cuvette body, generally indicated by reference numeral 200, is closed at the lower end of a plug 202 and at the upper end by a second plug 204. Lower plug 202 is provided with a passage 205 communicating with the interior of cuvette 200 through which any desired liquid may be introduced and is shaped to conform to the interior of cuvette 200, having an elongated base portion 206 extending below the lower edge of cuvette 200. Base portion 206 of plug 202 is provided with an opening 208 to receive a probe 210 through which the fluid sample enters cuvette 200. Probe 210 is enclosed in a second plug 212 which is inserted into opening 208 of lower plug 202. Plug 212 is shaped to conform to opening 208 and to provide a tight seal through the cooperation of circumferential notch 214 and O-ring 216, for example.

Within cuvette 200 is provided a cuvette float, generally indicated by reference numeral 218, which is so shaped in its several parts as to comprise, from the top down:

a. an upper section 220, closely fitting but movable within cuvette 200 having a vertical groove 222 cut into its periphery and a flat top surface 224 which at its lower end has a shoulder 226 which tapers down inwardly and is integral with, b. an intermediate portion 228 of decreased diameter and with, c. a center portion 230 of the same diameter as upper section 220 having a vertical groove 232 cut into its periphery about 180° from the circumferential position of groove 222 in upper section 220 with an inwardly tapering upper shoulder 233 and an inwardly tapering lower shoulder 234 which is integral with, d. an intermediate portion 227 of decreased diameter and with, e. a base portion 238 of the same diameter as upper section 220 closely conforming to the inner surface of cuvette 200 having an inwardly tapering upper shoulder 240 and a flat bottom surface 242 which is provided with a horizontal groove 246 cut partly across bottom surface 242 of base 238 as shown in FIG. 11 and which communicates with a short vertical groove 244 cut into the side of base 238 at the same circumferential position as groove 222. Grooves 244 and 246 form a channel which permits the fluid sample to flow into cuvette 200. The float cuvette shown in FIGS. 10 and 11 functions in the manner described for the cuvette shown in FIGS. 1 through 3 and the light path passes through chamber 249.

FIGS. 12, 13 and 14 illustrate still another modification of the float and cuvette assembly of my invention. In this modification, the cuvette body, generally indicated by reference numeral 250, is generally square in cross section as shown in FIG. 13 and is closed at the lower end by a plug 252 and at the upper end by second plug 254. Plugs 252 and 254 are shaped to conform to the interior of cuvette 250 and provide a tight seal. Lower plug 252 is provided with a passage 255 communicating with the interior of cuvette 250 through which any desired liquid may be introduced. Plug 252 has an elongated base portion 256 extending beyond cuvette 250. Base portion 256 is provided with an opening 258 to receive a probe 260 through which the fluid samples enter cuvette 250. Probe 260 is integral with a plug 262 which is inserted into opening 258 of lower plug 252 and is shaped to conform to opening 258 and provide a tight seal. Plug 262 is provided with a circumferential notch 264 into which an O-ring 266 or other sealing ring may be inserted. Thus sealed, plugs 252 and 262, together with upper plug 254, prevent leakage of any sample from cuvette 250. Held within cuvette 250 is a cuvette float, generally indicated by reference numeral 268, which is generally square in configuration as shown in FIG. 14, and which is so shaped in its several parts to comprise, from the top down:

a. an upper portion 270 of substantially square configuration closely fitted yet movable within cuvette 250 with two of the sides cut away at their edges to form a vertical beveled edge 272, the upper portion merging into a square lower shoulder 276 which is integral with, b. an intermediate center portion 278 of decreased diameter as shown in FIG. 12 and with, c. a base portion 280 of the same square configuration as upper portion 270 to conform closely to the inner surface of cuvette 250 but having a flat upper shoulder 282 and a flat bottom surface 284 with two of the sides being shaped to form a vertical beveled edge 286 as shown in FIG. 14. Beveled edges 272 and 286 form the channels through which the liquid sample flows into cuvette 250. The float cuvette shown in FIGS. 12 and 13 functions in the manner previously described and the light path through the cuvette when the float is at its uppermost position is through chamber 288.

While the above description defines the preferred embodiments of my invention, it is understood that further embodiments may be conceived without departing from the spirit of this invention.

I claim:

1. A novel cuvette assembly having a light path therethrough for spectrophotometric measurements of a liquid sample, said cuvette comprising the combination of:

a. a hollow transparent vessel through which the light path extends and having a bottom portion and a top portion with an inlet passage in the bottom portion to admit a test liquid into the transparent vessel;

b. a second passage in fluid communication with said vessel through the top portion; and c. a float element movably positioned in said hollow vessel, said float element comprising a base portion conforming in shape and substantially in diameter to the inner surface of said hollow vessel, said float element normally being positioned when no liquid is in the transparent vessel so as to interrupt the light path through said transparent vessel, said float element also including an upper portion of cross-sectional area smaller than that of said base portion, said base portion having a passageway therethrough to permit test liquid to flow from below to above said base portion, said float element being of a specific gravity which is less than the specific gravity of any test liquid to be tested in the transparent vessel, whereby test liquid entering said transparent vessel causes said float element to rise until it impinges on and seals off said second passage, thus exposing a light path through said vessel suitable for spectrophotometric measurements.

2. A cuvette assembly having a light path therethrough for photometric measurements of liquid samples including:

a. a hollow transparent vessel through which the light path extends and having a bottom portion with an inlet passage therethrough and a top portion with a second passage therethrough, said passages communicating with the interior of said vessel;

b. a float element disposed within said hollow vessel and configured so as to substantially define with the interior surface of said vessel a plurality of liquid chambers, including a cuvette rinse chamber and a sample test chamber, said float element being movable within said vessel and being of a specific gravity which is less than that of any liquid to be tested so as to be capable of floating on any such liquid; and c. said liquid chambers being in restricted mutual communication through said float element.

3. A cuvette having a light path therethrough for consecutive sampling of liquids to be tested as by a photometer, said cuvette comprising:

a. a hollow transparent vessel through which the light path extends and having a bottom portion with an inlet passage therethrough and a top portion with a second passage therethrough, said passages communicating with the interior of said vessel;

b. a combined float and separator element disposed within said vessel and configured so as to define with the interior surface of said vessel a plurality of liquid chambers including a cuvette rinse chamber and a sample test chamber, said chambers being in restricted mutual communication through said float and separator element, said float and separator element being of a specific gravity which is less than the specific gravity of any liquid to be tested; and c. means to motivate liquid sample into said liquid inlet passage and said chambers, whereby said combined float and separator element is caused to float within said vessel, such floating action effecting the rinsing of cuvette interior surface within said cuvette rinse chamber and the collecting of sample substantially free of cross-contamination in said sample test chamber.